United States Patent [19]
Harper, deceased
[11] 3,718,961
[45] March 6, 1973

[54] ELECTRICAL CONNECTION BETWEEN DISSIMILAR METALS

[76] Inventor: John L. Harper, deceased, late of Sharon, Pa. 16146 by Ann K. Harper, executrix

[22] Filed: Nov. 12, 1970

[21] Appl. No.: 89,095

Related U.S. Application Data

[62] Division of Ser. No. 742,268, July 3, 1968, abandoned.

[52] U.S. Cl. ........................29/191, 29/197, 29/199, 75/151
[51] Int. Cl. ............................................B32b 15/20
[58] Field of Search ...........29/197, 199, 191; 75/151

[56] References Cited

UNITED STATES PATENTS

| | | | |
|---|---|---|---|
| 2,087,716 | 7/1937 | Banscher | 75/151 |
| 3,391,446 | 7/1968 | Buttle | 29/197 X |
| 3,393,446 | 7/1968 | Hughes et al. | 29/197 X |
| 3,473,216 | 10/1969 | Webb | 29/197 X |
| 3,551,998 | 1/1971 | Bennett | 29/197 X |
| 3,598,550 | 8/1971 | Takahashi et al. | 29/197 X |

FOREIGN PATENTS OR APPLICATIONS

| | | | |
|---|---|---|---|
| 348,925 | 5/1905 | France | 75/151 |

*Primary Examiner*—L. Dewayne Rutledge
*Assistant Examiner*—E. L. Weise
*Attorney*—F. Shapoe and R. T. Randig

[57] ABSTRACT

A method and material for providing a good electrical and mechanical joint between aluminum and copper is described. Data is included to demonstrate the mechanical and electrical characteristics of joints made between aluminum and copper employing a novel cadmium zinc bonding composition.

2 Claims, 2 Drawing Figures

ELECTRICAL CONNECTION BETWEEN DISSIMILAR METALS

This application is a division of application Ser. No. 742,268 filed July 3, 1968, now abandoned and assigned to the same assignee as the present application.

BACKGROUND OF THE INVENTION

1. Field of the Invention

The present invention relates to a method for joining aluminum to copper for dependable joints having good electrical characteristics commensurate with good mechanical properties, and to a composition of matter for joining aluminum to copper without the necessity of plating the aluminum before such joining.

2. Description of Prior Art

Technological advances in the production of aluminum suitable for use as electrical conductors have resulted in the gradual supplanting, in certain areas, of aluminum for copper in certain power transformer applications. Nonetheless, it is imperative that certain areas require the continued use of copper of high conductivity quality. As a result, it has become necessary to join high conductivity aluminum to high conductivity copper.

Considerable difficulty has been experienced in joining these dissimilar metals. This results from the fact that while aluminum is a good conductor, it is a fairly highly reactive metal and has a tendency to form rapidly a self-healing tenacious skin of aluminum oxide on the surface thereof by reaction with air. This aluminum oxide surface protects the underlying metal and is quite refractory in nature. As a result, it becomes imperative, in order to properly join aluminum to either other members of aluminum or to a dissimilar metal, to clean the surface thereof and remove the tightly adherent tenacious aluminum oxide coating. Attempts to do this have met with a varied degree of success and about the only practical way of assuring a good joint between aluminum and copper resided in the preliminary plating of a layer of another metal having a less refractory oxide onto the aluminum surface. This could be done electrochemically. For example, after the removal of the aluminum oxide skin and without exposure to air a layer of copper, silver or copper alloy was deposited upon the clean exposed aluminum. This plating thereafter protected the aluminum from further oxidation and yet formed an ideal basis for joining with another dissimilar metal, for example, a copper conductor. However, this process is quite bothersome and costly and is not readily adaptable to the production of electrical devices such as transformers on a commercial basis. Accordingly, a method for the successful joining of aluminum to copper was desired without the necessity for preplating the aluminum prior to jointure with another dissimilar metal.

SUMMARY OF THE INVENTION

In order to alleviate the difficulty set forth hereinbefore, the present invention contemplates the joining of aluminum to copper. This is most readily accomplished by mechanically cleaning the surface of both the aluminum and the copper members before joining. Promptly thereafter a suitable flux is applied to the joint area and a bonding composition consisting essentially of between 20 to 40 percent zinc and the balance essentially cadmium, is placed in the space between the members to be joined, which are brought into contiguous relation, and then heat is applied (for example employing carbon electrodes in a brazing tong fixture or yet other heating methods can be employed until the joining metal melts and forms a peripheral fillet of molten composition between the metals being joined. Thereafter the heat is removed while the members are held firmly until the joining metal solidifies, following which the superficial flux is removed by a simple washing operation. This results in a joint that has excellent electrical characteristics and outstanding mechanical strength.

It is an object of the present invention to provide a method for joining aluminum to copper, which method is characterized by having outstanding electrical characteristics in the joint together with outstanding mechanical strength.

Another object of the present invention is to provide a joint material suitable for making a joint between aluminum and a dissimilar metal, particularly copper.

A more specific object of the present invention is to provide a method for joining aluminum to copper in which a cadmium-zinc joining metal is employed and heated until the joining metal melts and which by visual inspection can provide a satisfactory joint.

These and other objects of this invention will become apparent to one skilled in the art when read in conjunction with the following description and the drawings, in which:

FIG. 1 represents a schematic illustration by which the joined materials may be nondestructively tested for their electrical properties and thereafter destructively tested for their mechanical properties after simulated use in service; and FIG. 2 is a schematic illustration of an equivalent test rig which was employed for testing the electrical characteristics of the joint.

DESCRIPTION OF THE PREFERRED EMBODIMENT

Figure 1:
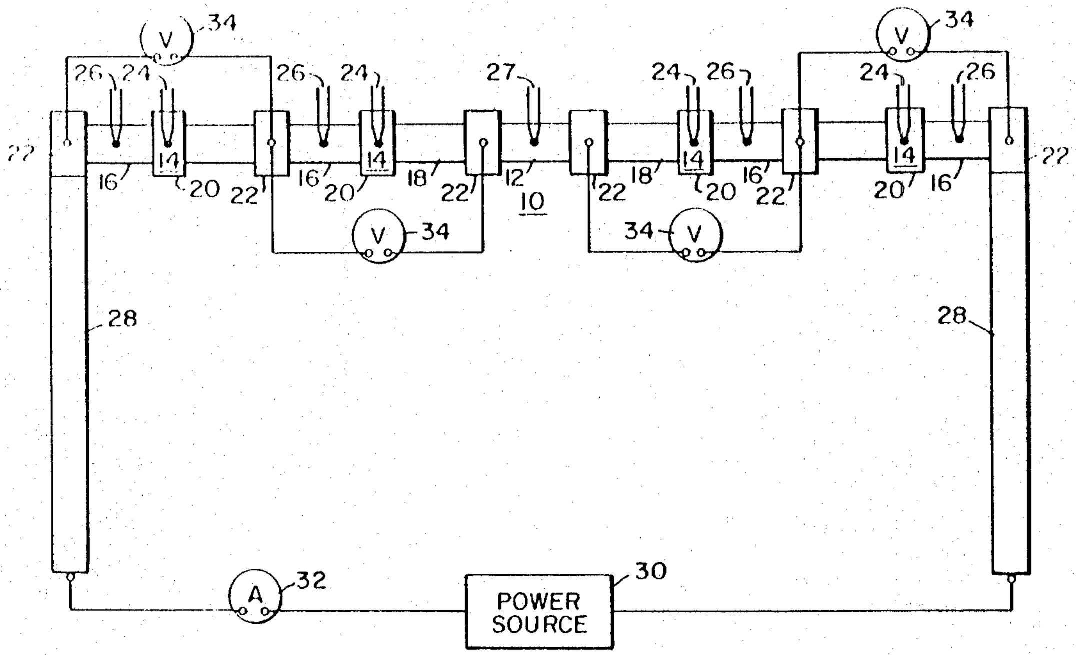

In practicing the process of the present invention it is preferred to clean the surfaces of both the copper and the aluminum prior to joining. This is most conveniently done by any sort of mechanical abrading and particular success has been found when a brush comprising nylon impregnated with silicon carbide was employed, such as is manufactured and sold by the Minnesota Mining and Manufacturing Company under the registered trademark "SCOTCHBRITE". By mechanically cleaning the surfaces of both the copper and the aluminum, the major part of the oxidized surface is removed prior to the joining thereof. Following cleaning the materials to be joined are treated with a flux in order to remove the last semblance of any surface oxides which may have been formed after the mechanical cleaning or what has remained from the mechanical cleaning, such fluxing occurring during the application of heat thereto. Any suitable water soluble flux which is suitable for removing aluminum oxide from aluminum preliminarily to soldering aluminum to a dissimilar metal may be employed, such as those fluxes disclosed in U.S. Pat. No. 2,238,609. Good success has been obtained with a flux containing about 40% of fluoride components in a triethylamine vehicle, such as sold by Alcoa as Flux No. 64. The flux is preferably applied to both the copper and the aluminum surfaces which are to be joined.

In assembling the joint prior to the application of heat thereto it is preferred to place a predetermined amount of joining composition to cover the area being joined together with a sufficient amount to form a smooth even fillet therebetween. This is accomplished by flattening the joining alloy to a predetermined thickness, typically about 0.010 inch in thickness and thereafter cutting the joining alloy to a wafer having the cross-sectional dimensions of the proposed joint. Thereafter, the cut wafer of joining alloy is assembled between and abutted by the aluminum and copper members each of which has been prepared by the application of flux thereto as previously described.

The joining composition comprises an alloy having between about 20% and about 40% zinc and the balance essentially all cadmium with incidental impurities. Good results are obtained where the joining material is composed of about 30 percent zinc and the balance essentially cadmium with incidental impurities. This material had a melting temperature of approximately 300°C, depending upon the actual composition. Following the assembly of the materials to be joined with the wafer of joining alloy therebetween, brazing tongs are placed across the joint area and heat is applied until the preplaced joining alloy material melts, flows and forms a neat fillet around the periphery of the joint. The fillet results from the capillary action between the metals being joined. After the fillet forms, the heating is discontinued but the brazing tongs are retained in place so as not to disturb the members until the joining alloy solidifies. After solidification and the tongs have been removed, the water soluble flux can then be removed from the joint area by washing or with a wet cloth.

It has been determined that the joint thus produced has adequate strength and electrical conductivity for electrical connections in power transformers as well as other applications. Typical mechanical properties of the joint include approximately 3,000 pounds per square inch in shear loading and about 10,000 pounds per square inch in tensile loading.

In order to more clearly demonstrate the method of the present invention and the suitability of the joining alloy for producing sound joints, reference is directed to the single figure of the drawing. The drawing illustrates a testing rig employed for determining the electrical characteristics and after full electrical testing as hereinafter set forth, the testing rig may be dissembled and the mechanical properties of the joint produced by the joining alloy of the present invention may be determined.

Referring to the drawing there is illustrated a test rig shown generally at 10 which comprises a control conductor 12 to which a plurality of test components 14 are attached. Each test component 14 comprises a conductor 16 of the same composition as the control conductor 12, a dissimilar metal conductor 18 and a joint 20 disposed between the conductor 16 and the dissimilar metal conductor 18. Disposed between each of the test components 14 and the control conductor 12 are equalizers 22 which provide equipotential planes for resistance measurements as will be set forth more fully hereinafter. Each of the test components 14 is provided with a thermocouple illustrated generally at 24 which is preferably placed at the midpoint of the joint 20 intermediate each of the equalizers 22. In addition thereto, bar thermocouples designated 26 are provided at selected positions on the conductors which are made of dissimilar material from the control conductor 12 in each test section. The control conductor is provided with a control conductor thermocouple 27 which is located midway between joints 2 and 3. Each of the conductors which are connected by means of the joining composition is of a predetermined length. However, each of the conductors 16 which is of the same material as control conductor 12 must have a cross-sectional area the same as that of the control conductor 12, whereas, the dissimilar metal conductor 18 which does not contain thermocouple 26 may be of different cross-sectional dimensions although the length is the same as that of the conductor 16 to which the thermocouple 26 is attached. The final equalizer 22 at each end of the test rig is connected to bus conductors 28 each of which is connected to a power source 30 from which the rig under test may be energized. Following testing as will be described more fully hereinafter, the test component 14 comprising the portions between the equalizers 22 forms the component from which the mechanical tests are performed to evaluate the joint.

Figure 2:
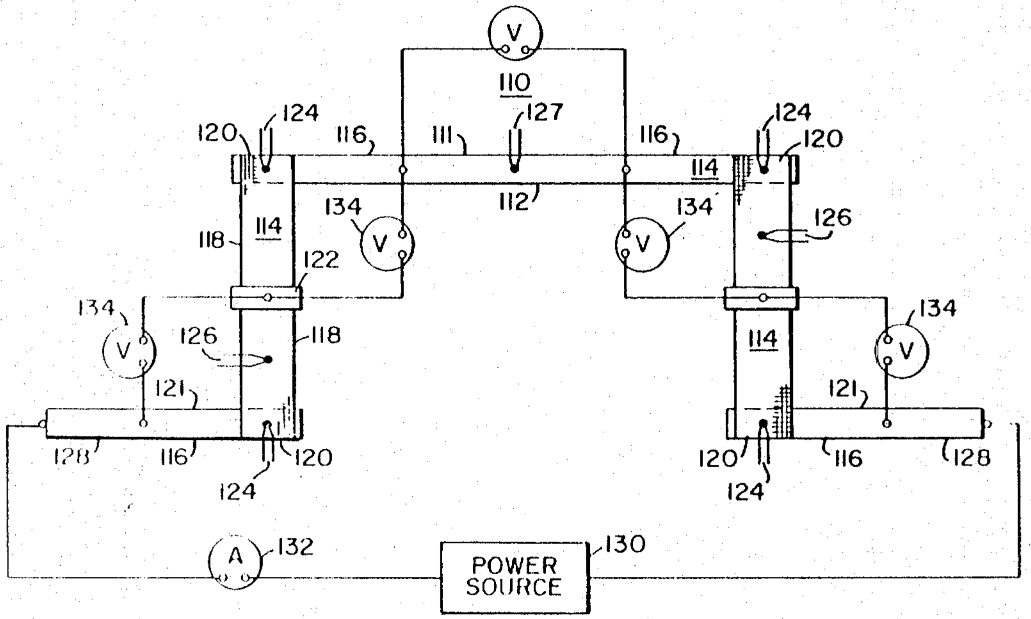

It will be appreciated that it may not be necessary to test the components for their mechanical properties each time, where, for example, as a matter of statistical quality control only the electrical characteristics are of interest. In such an instance, a more simplified test rig can be used. The joining alloy of the present invention was evaluated, as set forth hereinafter, for the integrity of its electrical characteristics employing the latter apparatus. Reference is directed to FIG. 2 which illustrates the testing rig so employed.

The testing rig is shown generally at 110 and comprises a bar 111 of predetermined length having a dissimilar metal conductor 118 connected thereto by means of the joining alloy under test to form joint 120. The bar 111 is divided into predetermined lengths, usually at intervals of 12 inches. The two intervals adjacent the midpoint of the bar 111 form the control conductor 112 and the interval 116 connected to the dissimilar metal conductor 118 is the equivalent of conductor 16 of FIG. 1. Therefore, the interval 116, conductor 118 and joint 120 form test component 114. Similarly, the other end of dissimilar conductor 118 is connected to another bar 121 which is also divided into intervals and the interval connected to the dissimilar metal is the same composition and dimensions as interval 116 and together with joint 120 and dissimilar conductor 118 they form another test component 114. The balance of conductor 121 is the equivalent of bus conductor 28 and is identified in FIG. 2 as 128. Each of the bus conductors 128 is connected to a source of power 130 from which the test rig 110 is energized. For practical purposes the dissimilar metal conductor 118 is a unitary piece and is provided with an equalizer 122 at the midpoint.

As stated, the test rig described with respect to FIG. 2 is employed for the purpose of testing the stability of the electrical characteristics of the joint. Two measurements are made, viz., joint resistance and joint temperature. In the measurement of joint resistance an ammeter 132 is connected in the circuit and the voltage drop over each joint 120 is measured by voltmeter 134 connected across equalizer 122 and either the beginning of bus conductor 128 or the end of control conductor 112. Temperature is measured employing control conductor thermocouple 127 secured to the midpoint of control conductor 112 and each joint 120 is provided with a joint thermocouple 124. In addition, bar thermocouples 126 are provided at selected intervals along the dissimilar metal conductor 118 in order to monitor the temperature thereof.

Having thus assembled the test components in the manner illustrated, the control conductor is heated to a predetermined temperature by the application of current from the power source 130. During the first 25 cycles, adjustment is made to obtain a steady-state total temperature. However, after the first 25 cycles, the heating current as adjusted is used for the remainder of the heating periods of the test regardless of the deviation from a steady-state control conductor temperature. In addition to the fact that the joint temperatures are recorded as well as the conductor temperatures the joint resistance is also measured for a period of at least 125 cycles per heating. The performance criteria of the joints when installed in an assembly and tested in accordance with the manner set forth hereinbefore have been determined from actual experience. More specifically, the criteria have been established that the resistance of the connections tested in accordance therewith should show a condition of stability between the 25th heating cycle and the completion of the number of heating cycles required in the test of a variation of not more than 5 percent from the average of the measured values in this interval. In addition thereto, the temperature of the joint tested in accordance therewith should not exceed the temperature of the control conductor. Moreover, the temperature difference between the control conductor and the joint should show a condition of stability from the 25th cycle to the end of the test as indicated by a decrease of said difference of not more than 10°C from the average of the measured differences in this interval for the joint.

Table I set forth hereinafter gives typical test results of material tested in accordance with the foregoing description.

ference is the control temperature minus the joint temperature as listed in columns headed C1, C2, C3 and C4. These results were thereafter averaged to give the average temperature difference for the C-1 joint, the C-2 joint and the C-3 and C-4 joints. Since the requirement is that the individual joints do not show a deviation of more than 10°C from the average temperature difference, the minimum acceptable temperature difference is set forth for each of the test joints. Comparing these values with the values set forth for the temperature differences at the number of cycles indicated it becomes clear that all four of the joints had no deterioration which was less than the minimum acceptable temperature difference.

To substantially the same effect the joint resistance measured at 20°C at the end of the cycles recorded indicates that all values were within the acceptable limits, thereby substantiating the integrity of the joint from the standpoint of the electrical characteristics.

Reference is directed to Table II hereinafter which lists some of the mechanical properties of the bond strength of the joint formed by the cadmium-zinc alloy between an aluminum conductor and a copper conductor.

TABLE II

Mechanical Properties

| Test No. | Al Conductor (inches) | Cu Conductor (inches) | Average Breaking Strength (pounds) |
|---|---|---|---|
| 1 | 0.129 × 0.580 | 0.081 × 0.144 | 325 |
| 2 | 0.129 × 0.580 | 0.081 × 0.182 | 401 |
| 3 | 0.064 × 0.750 | 0.102 × 0.289 | 502 |
| 4 | 0.129 × 0.580 | 0.091 dia. | 202 |
| 9 | 0.064 × 0.750 | 0.129 × 0.289 | 515 |

It should be noted that the larger dimension of the aluminum conductor was joined to the larger dimension of the copper conductor and the filler material of cadmium-zinc composition was disposed therebetween. Each conductor was joined in a ¾ inch overlap configuration with the joining material slightly exceeding the smallest dimension of the width of the overlap. From Table II it will be noted that in test No. 1 the 0.144 inch section of copper was joined to the 0.580 inch section of the aluminum conductor and the cadmium-zinc joining alloy disposed therebetween had a dimension of about 0.010

TABLE I.—.114×.204 ALUMINUM EC

| | | TEMPERATURE ° C. | | | | | | | | | | | | | | |
|---|---|---|---|---|---|---|---|---|---|---|---|---|---|---|---|---|
| | | Conductor control | | | Joint temp. | | | | Temperature diff. control minus joint temp. | | | | Joint resistance at 20° C. microhms | | | |
| | Amo. temp. | A | B | C | 1 | 2 | 3 | 4 | C-1 | C-2 | C-3 | C-4 | 1 | 2 | 3 | 4 |
| Number cycles | | | | | | | | | | | | | | | | |
| 0 | | | | | | | | | | | | | | | | |
| 12 | 28 | | | 278.7 | 165.5 | 156.5 | 151.3 | 156.3 | 113.2 | 122.2 | 127.4 | 122.4 | 1,068 | 1,049 | 1,084 | 1,085 |
| 37 | 29 | | | 284 | 167 | 155.2 | 153.8 | 163.5 | 117 | 128.8 | 130.2 | 120.5 | 1,073 | 1,051 | 1,087 | 1,087 |
| 63 | 28 | | | 269 | 161 | 153 | 146 | 153 | 108 | 116 | 123 | 116 | 1,072 | 1,049 | 1,089 | 1,088 |
| 78 | 28 | | | 276.7 | 167.9 | 144.5 | 158.1 | 153.1 | 108.8 | 132.2 | 118.6 | 123.6 | 1,075 | 1,055 | 1,092 | 1,085 |
| 112 | 28 | | | 272.3 | 173.7 | 153.8 | 148 | 164 | 98.6 | 119.5 | 124.3 | 108.3 | 1,071 | 1,054 | 1,088 | 1,091 |
| 139 | 28 | | | 276 | 172.5 | 159.5 | 158.5 | 170.5 | 103.5 | 116.5 | 117.5 | 105.5 | 1,074 | 1,049 | 1,088 | 1,091 |
| Average temp. diff. | | | | | | | | | 107.2 | 122.6 | 122.7 | 114.7 | 1,070 | 1,047 | 1,093 | 1,090 |
| Min. accpt. temp. diff. | | | | | | | | | 97.2 | 112.6 | 112.7 | 104.7 | | | | |
| Average resistance | | | | | | | | | | | | | 1,072 | 1,051 | 1,089 | 1,088 |
| Max. accpt. resistance | | | | | | | | | | | | | 1,126 | 1,104 | 1,143 | 1,142 |
| Min. accpt. resistance | | | | | | | | | | | | | 1,018 | 998 | 1,035 | 1,034 |

Referring to Table I it is seen that various temperatures are recorded for the control conductor, such temperatures being listed after the number of cycles indicated in the first column. The average corresponding joint temperature for each of the joints tested was listed in the next section and, of course, the temperature difby about 0.150 by about 0.800. Heat was applied to the assembled conductors and after the joining metal was molten, heating was discontinued although the brazing tongs remained in place until the fillet formed and the joining metal cooled to the solidification point. After testing for electrical characteristics as aforesaid and separation from the equalizers, the test components were thereafter placed in the grips of a tensile testing machine and the samples were pulled apart at a rate of 2 inches per minute. The breaking strength and the location of the failure were recorded. Thus it is noted from test I that the ¾ inch lap joint of the 0.144 dimension copper conductor joined to the 0.580 aluminum conductor had an average breaking strength of 325 pounds. Where, however, the face of the copper conductor which was joined to the face of the aluminum conductor was increased as set forth in Test II, it is noted that a substantially higher breaking strength was recorded.

It is believed significant to point out that with respect to Test No. 3 the dimensions were increased sufficiently so that an average breaking strength of 502 pounds was recorded. However, this breaking strength was also accompanied by the fact that the fracture occurred in the aluminum conductor. When it is considered that a load of 502 pounds placed on the section measuring 0.064 by 0.750 inches, it will be seen that the tensile strength of the aluminum conductor is exceeded. Accordingly, as might be predicted, the fracture occurred in the aluminum conductor and not in the joint as such.

even where a rectangular aluminum conductor and a round copper conductor are joined it is noted that the average breaking strength is still quite high, as in Test No. 4 which required a breaking strength of 202 pounds in order to fracture the joint. The conditions of Test No. 3 were repeated with a thicker copper conductor and the results are reported as Test No. 9 in Table II. As would be expected, while an average breaking strength of 515 pounds was recorded, nonetheless the fracture occurred in the aluminum conductor.

As stated previously, it is preferred to not only mechanically clean the surfaces of the materials to be joined, but in addition thereto it is preferred to apply a water soluble flux to the areas to be joined. The effect of a clean and uncleaned joint with respect to the mechanical properties is set forth in Table III hereinafter.

TABLE III

Cleaned and Uncleaned Joints

| Al Conductor | Cu Conductor | Breaking Strength |
|---|---|---|
| Clean Joint | | |
| 0.064 × 0.750 | 0.091 × 0.289 | 506 |
| Unclean Joint | | |
| 0.064 × 0.750 | 0.091 × 0.289 | 400 |

From the test results reported in Table III, it is seen that the clean joint which was made between conductors of 0.064 × 0.750 aluminum conductor and 0.091 × 0.289 copper conductor had a breaking strength of 506 pounds. As would be expected from the test results recorded hereinbefore, this breaking strength which was recorded was in excess of the tensile strength of the aluminum and as a result thereof the fracture occurred in the aluminum conductor. Where, however, the parts to be joined are merely mechanically cleaned and do not employ a flux, it is seen that these same size conductors exhibit a breaking strength on the average of 400 pounds. At this particular level the fracture did occur in the joint thereby substantiating the necessity for both mechanically cleaning the joint and thereafter fluxing the same prior to the application of the joining alloy and the application of heat for making the joint between such dissimilar metals.

Other considerations which merit control are the temperature to which the joint is heated and the volume of the joining alloy employed for proper joint fillet. As stated previously, the cadmium-zinc joining alloy of the present invention has a melting point of about 300°C. It becomes apparent that the joint temperature must be raised to above 300°C. However, where considerably higher temperatures than those necessary for melting the joining alloy are employed with the preferred water soluble flux, poor joints result which can be broken by simple hand pulling. Examination of the joint indicates a black residue from the flux, thereby impairing its effectiveness. Even if a higher operating temperature flux is employed, too high a superheat to the joining alloy can cause other problems including oxidation of the joining alloy as well as the conductors themselves which can adversely affect the electrical characteristics of the joint.

Where the volume of the joining alloy was controlled so that small and incomplete fillets were formed in the joint, a noticeable decrease was observed in the breaking strength exhibited by the joint. Large fillets did not appear to significantly improve the breaking strength.

It will of course be understood that while reference has been made to assembling the conductors with the preplaced joining alloy therebetween, equally good results have been obtained where each of the conductors was precoated with a cadmium-zinc alloy and thereafter assembled and heated to join the dissimilar metals.

From the foregoing it should be noted that the cadmium-zinc composition employed in joining the dissimilar metals aluminum to copper has provided a relatively simple method of joining these materials together. While the method is quite simple, nonetheless the joints made by employing this composition of matter have exhibited outstanding mechanical characteristics. In addition to the fact that the joints exhibit outstanding mechanical characteristics, repeated testing through a number of heating cycles indicates that the joints have excellent electrical stability. The testing indicates that the joining composition is quite stable at operating temperatures of up to 160°C and after repeated cycling, the stability of the joint is outstanding.

I claim as my invention:

1. A transformer winding joint between an aluminum conductor and a copper conductor which joint is characterized by excellent electrical properties and mechanical strength comprising a high conductivity copper conductor, a high conductivity aluminum conductor contiguous to the copper conductor and a joint alloy disposed between and uniting said copper and aluminum conductors said joint alloy having a composition within the range between about 20 percent and about 40 percent zinc and the balance essentially cadmium with incidental impurities.

2. The joint of claim 1 in which the joint alloy has a composition of about 30 percent zinc and the balance cadmium with incidental impurities.

* * * * *